(12) United States Patent
Aitken et al.

(10) Patent No.: US 8,143,179 B2
(45) Date of Patent: Mar. 27, 2012

(54) TRANSPARENT, COLORLESS TITANIA-FREE BETA-QUARTZ GLASS-CERAMIC

(75) Inventors: Bruce Gardiner Aitken, Corning, NY (US); Marie Jacqueline Monique Comte, Fontenay aux Roses (FR); Lothar Wondraczek, Erlangen (DE)

(73) Assignee: EuroKera, Chierry (FR)

( * ) Notice: Subject to any disclaimer, the term of this patent is extended or adjusted under 35 U.S.C. 154(b) by 86 days.

(21) Appl. No.: 12/516,892

(22) PCT Filed: Nov. 29, 2007

(86) PCT No.: PCT/EP2007/063003
§ 371 (c)(1),
(2), (4) Date: Dec. 14, 2009

(87) PCT Pub. No.: WO2008/065167
PCT Pub. Date: Jun. 5, 2008

(65) Prior Publication Data
US 2010/0099546 A1   Apr. 22, 2010

(30) Foreign Application Priority Data

Nov. 30, 2006  (FR) ...................... 06 55232

(51) Int. Cl.
*C03C 10/12* (2006.01)
(52) U.S. Cl. .................. 501/4; 501/7; 65/33.8
(58) Field of Classification Search .................. 501/4, 7; 65/33.8
See application file for complete search history.

(56) References Cited

U.S. PATENT DOCUMENTS

| | | | |
|---|---|---|---|
| 6,750,167 B2* | 6/2004 | Kitamura et al. | 501/4 |
| 2003/0054935 A1* | 3/2003 | Kitamura et al. | 501/4 |
| 2004/0157720 A1* | 8/2004 | Sakamoto et al. | 501/4 |
| 2007/0004578 A1* | 1/2007 | Monique Comte | 501/4 |
| 2007/0213192 A1* | 9/2007 | Monique Comte et al. | 501/7 |
| 2008/0026927 A1* | 1/2008 | Monique Comte | 501/7 |
| 2010/0130342 A1* | 5/2010 | Siebers et al. | 501/7 |

FOREIGN PATENT DOCUMENTS

JP        01052631       *  2/1989

\* cited by examiner

*Primary Examiner* — Karl Group
(74) *Attorney, Agent, or Firm* — Michael W. Russell

(57) ABSTRACT

The invention relates to a transparent and essentially colorless β-quartz glass-ceramic material which is free of $TiO_2$, $As_2O_3$, $Sb_2O_3$ and phosphates; articles formed from said glass-ceramic material; lithium aluminosilicate glasses, precursors for said glass-ceramic material; and methods of producing said glass-ceramic material and said articles formed from said glass-ceramic material.

8 Claims, 1 Drawing Sheet

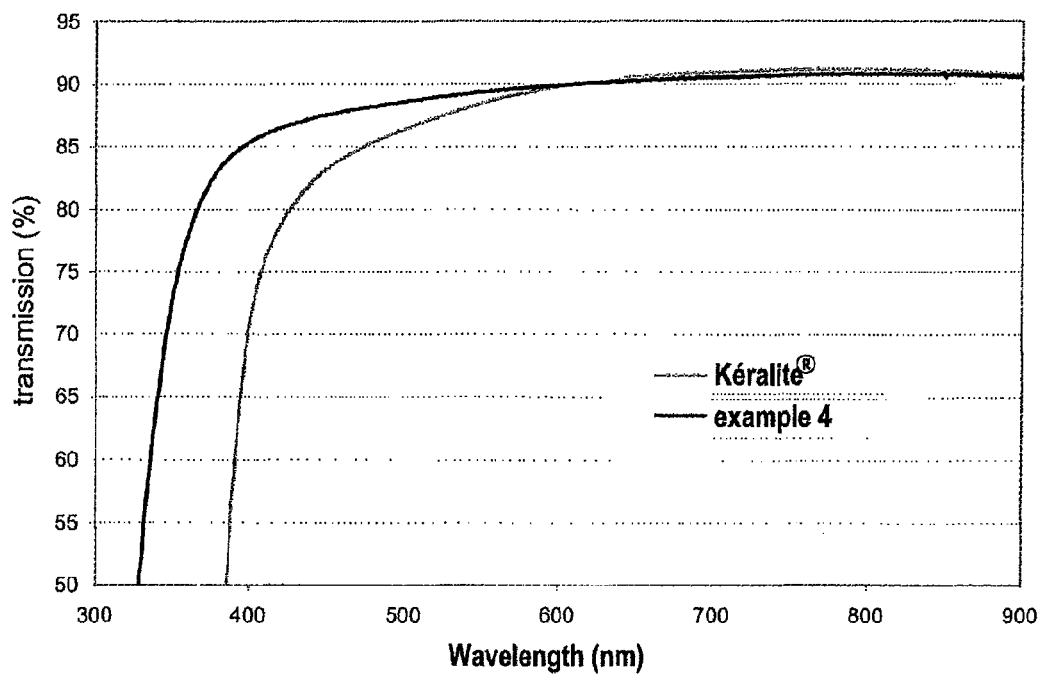

TRANSPARENT, COLORLESS TITANIA-FREE BETA-QUARTZ GLASS-CERAMIC

TECHNICAL FIELD

The present invention relates to glass-ceramic materials in general, precursor glasses therefore, articles comprising a glass-ceramic material, and process for making a glass-ceramic material. In particular, the present invention relates to glass-ceramic materials comprising β-quartz as the predominant crystalline phase that are essentially transparent and colorless in the visible spectrum, as well as precursor glass materials thereof, articles comprising the same and processes for making the same.

BACKGROUND

Transparent glass-ceramic materials with a low thermal expansion coefficient (CTE), which contain a solid solution of β-quartz as the principal crystalline phase, have been described in a number of publications, in particular by W. Hoeland and G. Beall, in "Glass-ceramic technology", Am. Ceram. Soc., Westerville (2002), pages 88-96. Said glass-ceramic materials are generally obtained by heat treating a precursor glass (more conventionally a mixture of the constituents of said glass: a mineral charge, a precursor of such glass), the composition of which is of the $LiO_2$—$Al_2O_3$—$SiO_2$ (LAS) type. Said heat treatment includes a nucleation stage followed by a crystal growth stage.

The manufacture of articles made of β-quartz glass-ceramic conventionally includes the three principal successive steps: a first step of melting a batch material, such as a mixture of raw starting materials and/or glass cullet, usually carried out between 1550° C. and 1750° C.; a second step of cooling and forming the molten glass obtained into desired shape; and a third step of crystallizing or ceramming the shaped cooled glass by a suitable heat treatment (including the phases of nucleation and crystal growth mentioned above).

Glass-ceramic materials comprising β-quartz solid solution as the predominant crystalline phase, having various degree of transparency and being essentially colorless, were known. For example, U.S. Pat. Nos. 3,252,811, 3,977,886, 4,093,468, 5,017,519, and 6,750,167, as well as DE 1,496,497, JP 06-96460 and JP 2001-348250 are all concerned with such glass-ceramic materials. Particularly, the presently claimed invention may be considered as an improvement to the one described in JP 06-96460. The ranges given in said document are large, i.e. the one for $SiO_2$ and there is no specific teaching with regard the content of MgO+ZnO. All the exemplified compositions include $As_2O_3$, some of them include $P_2O_5$. In contrast to the teaching of JP 06-96460, the inventors of the present invention found a compositional range where, explicitly, no $As_2O_3$ is needed for fining and besides other measures, particularly a specified amount of MgO and ZnO is used to facilitate the melting process and improve optical performance.

Current commercial products of essentially transparent, essentially colorless glass-ceramic tend to have a undesirable color tint in the visible spectrum. There remains a need of a transparent, colorless glass-ceramic comprising β-quartz solid solution as the predominant crystalline phase.

SUMMARY

According to a first aspect of the present invention, provided is an essentially colorless, transparent glass-ceramic material containing a solid solution of β-quartz as the principal crystalline phase, having a composition, expressed in percentages by weight on the basis of oxides of the total composition, consisting essentially of:

| | |
|---|---|
| $SiO_2$ | 66-72 |
| $Al_2O_3$ | 18.3-24 |
| $Li_2O$ | 2.2-5 |
| $ZrO_2$ | 2-5 |
| $SnO_2$ | >0.4-3 |
| $CeO_2$ | 0-1 |
| $WO_3 + MoO_3$ | 0-<1 |
| $CeO_2 + WO_3 + MoO_3$ | 0-<1 |
| $Nb_2O_5$ | 0-3 |
| $CeO_2 + WO_3 + MoO_3 + Nb_2O_5$ | 0-3 |
| MgO | 0-3 |
| ZnO | 0-4 with MgO + ZnO 2.2-4.6 |
| SrO | 0-2.5 |
| BaO | 0-2.5 |
| $K_2O + Na_2O$ | 0-<1 |
| $Gd_2O_3 + La_2O_3 + Ta_2O_5 + Y_2O_5$ | 0-4 |
| $Nd_2O_3 + Er_2O_3$ | 0-0.1 and |
| $Fe_2O_3$ | <0.04; | the said composition being essentially free of titanium dioxide, arsenic oxide, antimony oxide and phosphates, with the exception of inevitable traces thereof.

According to certain embodiments of the glass-ceramic material of the present invention, the material has a composition, expressed in percentages by weight of the total composition on the basis of oxides, consisting essentially of:

| | |
|---|---|
| $SiO_2$ | 67.7-70.7 |
| $Al_2O_3$ | 18.7-21 |
| $Li_2O$ | 2.5-3.6 |
| $ZrO_2$ | 2.4-3.8 |
| $SnO_2$ | 0.6-1.8 |
| $CeO_2 + WO_3 + MoO_3$ | 0-<0.6 |
| $Nb_2O_5$ | 0-1 |
| MgO | 0-3 |
| ZnO | 0-4 with MgO + ZnO 2.2-4.6 |
| SrO | 0-<1 |
| BaO | 0-<1 |
| $K_2O$ | 0-<0.8 |
| $Gd_2O_3 + La_2O_3 + Ta_2O_5 + Y_2O_5$ | 0-2 |
| $Nd_2O_3 + Er_2O_3$ | 0-0.06 and |
| $Fe_2O_3$ | <0.02. |

According to certain embodiments of the glass-ceramic material of the present invention, which may or may not be embodiments specifically described above, the weight percentages of MgO, ZnO, SrO and BaO in the composition are such that (i) MgO+ZnO: 2.7-4.4; and/or (ii) ZnO+BaO+SrO: 1-4, advantageously 1-3.5.

According to certain embodiments of the glass-ceramic material of the present invention, which may or may not be embodiments specifically described above, the composition of which is further free of halides, with the exception of inevitable traces thereof.

According to certain embodiments of the glass-ceramic material of the present invention, which may or may not be embodiments specifically described above, the composition of which is further free of borates, with the exception of inevitable traces thereof.

A second aspect of the present invention is an article made of a glass-ceramic material of the first aspect of the present invention (including but not limited to those of the specific embodiments of the glass-ceramic material described above), such as a cook plate, a cooking utensil, a microwave oven plate, a fireplace window, a fire door or window, a viewing window for pyrolysis or catalysis furnaces, a lens article, an article of tableware or an architectural element.

A third aspect of the present invention is a precursor glass material of the glass-ceramic material of the first aspect of the present invention (such as the glass-ceramic material according to the specific embodiments of the first aspect of the present invention described above). The glass material has a chemical composition corresponding to that of the glass-ceramic described above.

A fourth aspect of the present invention is a method for producing a glass-ceramic material according to the first aspect of the present invention described above (including but not limited to those of the specific embodiments described above), comprising heat treating a lithium aluminosilicate glass, a precursor of said glass-ceramic material, or a mineral charge, itself a precursor of such a lithium aluminosilicate glass, under conditions ensuring its ceramming, characterized in that the composition of said glass or said mineral charge corresponds to that of a glass-ceramic material of the first aspect of the present invention described above.

In certain embodiments of the process of the fourth aspect of the present invention, the process comprises the following steps in sequence: (a) melting a lithium aluminosilicate glass or a mineral charge, a precursor of such a glass, said glass or said charge including an effective and non excessive quantity of at least one fining agent; followed by fining the molten glass obtained; (b) cooling the fined, molten glass obtained and simultaneously forming it into the desired shape for the intended article; and (c) ceramming said shaped glass; characterized in that said glass or said mineral charge, upon being melted, has a composition which corresponds to that of a glass-ceramic material of the first aspect of the present invention described above (including but not limited to those of the specific embodiments of the glass-ceramic material described above).

In certain embodiments of the process of the fourth aspect of the present invention, the ceramming is carried out for a period of 300 min or less at a temperature of lower than 1000° C., advantageously lower than 950° C.

One or more embodiments of the various aspects of the present invention have one or more of the following advantages: highly transparent and highly colorless glass-ceramic material having β-quartz solid solution as a predominant crystalline phase can be made.

Additional embodiments of the invention will be set forth, in part, in the detailed description, and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The accompanying drawing, which is incorporated in and constitutes a part of this specification, illustrates certain embodiments of the instant invention and together with the description, serves to explain, without limitation, the principles of the invention.

The accompanying FIGURE shows the transmission curves of (i) a glass-ceramic material according to one embodiment of the present invention (Example 4 below) (ii) a comparison example (Keralite®, a glass-ceramic material comprising $TiO_2$ described below).

DETAILED DESCRIPTION

The following description of the invention is provided as an enabling teaching of the invention in its best, currently known embodiment. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Unless otherwise indicated, all numbers such as those expressing weight percents of ingredients, dimensions, and values for certain physical properties such as coefficient of thermal expansion (CTE) used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, the singular forms "a," "an" and "the" include plural referents unless the context clearly dictates otherwise. Thus, for example, reference to a "glass-ceramic material" includes embodiments having two or more such glass-ceramic materials unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, a "wt %" or "weight percent" or "percent by weight" of a component, unless specifically stated to the contrary, is based on the total weight of the composition or article in which the component is included.

The present invention relates to the field of transparent, essentially colorless β-quartz glass-ceramic materials. More particularly, it provides: novel transparent and essentially colorless β-quartz glass-ceramic materials which are free of $TiO_2$, $As_2O_3$, $Sb_2O_3$ and phosphates; articles made of said novel glass-ceramic materials; lithium aluminosilicate glasses, precursors of said novel glass-ceramic materials; and methods of producing said novel glass-ceramic materials and said articles made of said novel glass-ceramic materials.

To obtain the desired microstructure (comprising a solid solution of β-quartz and β-eucryptite (simply denoted "β-quartz" in the remainder of the present text) in a vitreous matrix), with optimization of said microstructure (optimization as regards the size and distribution of crystallites, to obtain translucent or transparent glass-ceramic materials with low coefficients of thermal expansion (CTE)), efficient nucleating agents are conventionally used. $TiO_2$ and/or $ZrO_2$ are generally employed as the nucleating agent. $TiO_2$ is by far the most widely used nucleating agent, since $ZrO_2$ alone must be used in amounts which are at the solubility limit (resulting in a higher temperature for melting of the precursor glass, non-homogeneous nucleation, risks of devitrification during the processing and/or zones that are enriched in residual $ZrO_2$ in the glass-ceramic). In any event, $ZrO_2$ is commonly considered a much less efficient nucleating agent than $TiO_2$ in that it requires much longer ceramming times.

Further, to obtain "essentially colorless" transparent glass-ceramic materials, the presence in said glass-ceramic materials of coloration sites, i.e. the presence of ions or ion pairs which when exposed to visible light can undergo electronic transitions, should be avoided. However, it should be noted that the term "essentially colorless" means both "intrinsically essentially colorless" (because of the absence of ions or ion pairs, as discussed above) and "essentially colorless due to compensating coloration" by development of a complementary color in the material (see the disclosure in U.S. Pat. No. 4,093,468 mentioned above).

Though it appears the presence in a glass-ceramic of compounds imparting coloration could be avoided by avoiding or minimizing the introduction of said compounds or precursors thereof into the raw materials, the situation becomes more complex when certain necessary components can interact with a color-imparting species in the glass-ceramic material. For example, it is known that the presence of $Fe_2O_3$ alone (no $TiO_2$) up to contents of the order of 300 ppm in a glass-ceramic is generally not a concern as regards coloration. However, the joint presence of $Fe_2O_3$ and $TiO_2$ generates a characteristic yellowish tint. A number of commercial products which are otherwise known for their high transparency retain this yellowish tint, in particular those sold by the Applicant under the trade name KERALITE® (described in European patent application EP 0 437 228), those sold by Schott AG under the trade name ROBAX® and those sold by Nippon Electric Glass under the trade name NEOCERAM® N-0, because of the joint presence in their compositions of $TiO_2$ and $Fe_2O_3$. Treating the raw materials used to reduce the $Fe_2O_3$ content to below 150 ppm in particular is an expensive operation (an option mentioned in Japanese patent application JP 2001-348250) and it is seen above that $TiO_2$ is the best performing nucleating agent, allowing ceramming to occur on reasonable time scales. To overcome the technical problem mentioned above—obtaining transparent β-quartz glass-ceramic materials with no yellowish coloration—one possible approach seems to be to dispense with the presence of $TiO_2$ during manufacture.

It is also noted that at the end of the first melting step of a method of producing an article made of β-quartz glass-ceramic as described above, it is opportune to eliminate gaseous inclusions from the molten mass of glass as efficiently as possible. To this end, at least one fining agent is used. Currently, the most widely used fining agent is $As_2O_3$ and/or $Sb_2O_3$ (see above). The use of $CeO_2$, $SnO_2$, and other compounds such as halides has also been described. Since $As_2O_3$, the halides and $Sb_2O_3$ are advantageously avoided in view of their toxicity, said halides and $Sb_2O_3$ also being highly volatile, the skilled person will principally turn to using $SnO_2$. Further, $CeO_2$ is known to generate a strong yellow coloration in the presence of $TiO_2$ and the inventors have also observed this same problem as a result of the interaction of $SnO_2$ (and that of $Nb_2O_5$) with $TiO_2$.

As a result, it was apparent to the inventors that the presence of $TiO_2$ should advantageously be avoided in the composition of an essentially colorless transparent glass-ceramic, not only because of the interaction of $TiO_2$ with $Fe_2O_3$, but also because of the interaction of $TiO_2$ with non-toxic fining agents such as $SnO_2$, $CeO_2$, and $Nb_2O_5$.

The technical problem addressed by said inventors was thus that of obtaining glass-ceramic materials and glass-ceramic articles of β-quartz (with a low thermal expansion coefficient (CTE)) that are transparent and essentially colorless, from precursor glasses that are free of $TiO_2$ and unwanted fining agents ($As_2O_3$ and $Sb_2O_3$); and with no devitrification problems occurring during fusion and/or forming and within reasonable ceramming periods (and surprisingly, this proves to be possible in less than 6 h).

With reference to said technical problem, the inventors have identified a family of particularly interesting glass-ceramic materials, the composition of which jointly includes both $ZrO_2$ and $SnO_2$, and optionally $CeO_2$ and/or $WO_3$ and/or $MoO_3$ and/or $Nb_2O_5$.

In a first aspect, the present invention thus provides an essentially colorless transparent glass-ceramic material, containing a solid solution of β-quartz as the principal crystalline phase, the composition of which, expressed as percentages by weight on the basis of oxides, essentially consists of:

| | |
|---|---|
| $SiO_2$ | 66-72 |
| $Al_2O_3$ | 18.3-24 |
| $Li_2O$ | 2.2-5 |
| $ZrO_2$ | 2-5 |
| $SnO_2$ | >0.4-3 |
| $CeO_2$ | 0-1 |
| $WO_3 + MoO_3$ | 0-<1 |
| $CeO_2 + WO_3 + MoO_3$ | 0-<1 |
| $Nb_2O_5$ | 0-3 |
| $CeO_2 + WO_3 + MoO_3 + Nb_2O_5$ | 0-3 |
| MgO | 0-3 |
| ZnO | 0-4 with MgO + ZnO 2.2-4.6 |
| SrO | 0-2.5 |
| BaO | 0-2.5 |
| $K_2O + Na_2O$ | 0-<1 |
| $Gd_2O_3 + La_2O_3 + Ta_2O_5 + Y_2O_3$ | 0-4 |
| $Nd_2O_3 + Er_2O_3$ | 0-0.1 |
| $Fe_2O_3$ | <0.04; and | the said composition being free of titanium dioxide, arsenic oxide, antimony oxide, and phosphates, with the exception of inevitable traces thereof.

The notions of "transparent" and "essentially colorless" are familiar to the skilled person. They are quantified below. The values indicated remain, however, magnitudes and should not be interpreted strictly.

Samples of the glass-ceramic materials of the invention, 3 mm thick, generally have the values indicated below for the L* (lightness), a* and b* (color coordinates) parameters in the "CIE 1976 Lab" color space (International Commission on Illumination, 1976) measured using standard illuminant C:

L*>90;
−2<a*<2; and
−2<b*<12.

The skilled person generally accepts that a value of L* of more than 90 is required for high transparency and a value of a* of less than 2 is required for a slight yellowish tint. It has been observed that a value of b* of more than 12 is generally associated with an opalescent appearance.

Further, the thermal expansion coefficient (CTE) of the glass-ceramic materials of the invention (measured between 25° C. and 700° C.) is generally in the range of $-10 \times 10^{-7} K^{-1}$ to $+15 \times 10^{-7} K^{-1}$.

It has been indicated that the principal crystalline phase is a β-quartz solid solution. In the glass-ceramic materials of the invention, the residual vitreous phase generally represents less than 35% by weight and the β-quartz solid solution represents at least 65% of the crystallized fraction. Referring to the crystalline phase of the glass-ceramic materials of the invention (transparent β-quartz glass-ceramic materials, despite the absence of $TiO_2$), the following can be stated in a non-limiting manner. Said crystalline phase is generally principally constituted by: (a) at least 80% by weight of a solid solution of β-quartz or β-eucryptite; (b) 2% to 14% by weight of cubic $ZrO_2$; and (c) at most 2% by weight of β-spodumene.

The crystallite size is generally below 70 nm (nanometers).

It has been indicated that the composition "essentially consists of" the compounds (oxides) listed above. This means that in the glass-ceramic materials of the invention, the sum of the compounds (oxides) listed represents at least 95%, generally at least 98% by weight. However, the presence of small quantities of other compounds in said glass-ceramic materials cannot be completely excluded.

Referring now to the composition by weight of the glass-ceramic materials of the invention, the following non-limiting points may be mentioned:

(1) The glass-ceramic materials in question are of the LAS type. They contain $Li_2O$, $Al_2O_3$, and $SiO_2$ as essential constituents of the solid β-quartz solution, which gives them their transparency and the low thermal expansion coefficient (CTE). The ranges indicated for said essential constituents are narrow. It has been determined that: (A) the amount of $SiO_2$ is limited to between 66 wt. % and 72 wt. % to obtain advantageous results as regards the characteristics of the final product (high transparency and low thermal expansion coefficient (CTE)) and the way of carrying out the method of obtaining said final product (melting procedure and ceramming time). The $SiO_2$ content is advantageously in the range 67.7 wt. % to 70.7 wt. %; (B) the $Al_2O_3$ content is limited to between 18.3 wt. % and 24 wt. %, advantageously to between 18.7 wt. % and 21 wt. %. If said $Al_2O_3$ content is too low (<18.3 wt. %), the transparency of the final product decreases and ceramming becomes too slow. If said $Al_2O_3$ content is excessive (>24 wt. %), melting and ceramming are difficult to carry out and devitrification phenomena are observed during forming of said glass; and (C) the $Li_2O$ content is limited to between 2.2 wt. % and 5 wt. %, advantageously to between 2.5 wt. % and 3.6 wt. %. A minimum of 2.2 wt. % of $Li_2O$ is necessary to obtain a transparent glass-ceramic with a low thermal expansion coefficient (CTE) and to minimize the ceramming time. If the $Li_2O$ content is excessive, devitrification phenomena may be observed.

(2) The glass-ceramic materials of the invention include $ZrO_2$ as a nucleating agent. It will be recalled that they are free of $TiO_2$. Their $ZrO_2$ content is in the range 2% to 5% by weight, and advantageously in the range 2.4% to 3.8% by weight.

(3) $SnO_2$ is an essential constituent of the glass-ceramic materials of the invention. It carries out two primary functions: that of a nucleating agent (as regards this function, the remarkable combined action of $ZrO_2$ and $SnO_2$ is emphasized) and a fining agent (it will be recalled that the glass-ceramic materials of the invention are free of arsenic oxide and antimony oxide). If the $SnO_2$ content is too low ($\leq 0.4$ wt. %), problems are encountered as regards nucleation and refining; if the $SnO_2$ content is too high (>3 wt. %), melting is difficult to carry out and problems of devitrification may be encountered. Said $SnO_2$ content is advantageously in the range 0.6 wt. % to 1.8 wt. %. With a $SnO_2$ content of more than 1.8 wt. %, a grayish to yellowish coloration starts to develop. It intensifies as said content increases.

(4) $CeO_2$, $WO_3$, $MoO_3$, and $Nb_2O_5$ may be used as a fining agent, alone or in combination. The amount of $CeO_2$ is 0-1 wt. %. It is advantageously 0-<1 wt. %. The sum of oxides of tungsten and/or molybdenum, expressed as $WO_3+MoO_3$, is limited to less than 1 wt % for the following reasons: while both constituents in limited quantity can be used to assist fining of the melt, if their total amount exceeds 1 wt. %, a large number of relatively small bubbles may form in the glass melt at temperatures between 1550° C. and 1750° C., and those bubbles are very difficult to remove. Thus, used in too large quantities, the effect of $WO_3$ and $MoO_3$ may be rendered negative. Additionally, both constituents and particularly $MoO_3$, if used in too large quantities, may generate different types of coloration in the final glass-ceramics. The amount of $CeO_2+WO_3+MoO_3$ is limited to less than 1 wt. %. Beyond that amount, the appearance of a yellow tint may be observed. The amount of $CeO_2$ and/or $WO_3$ and/or $MoO_3$ is advantageously limited to less than 0.6 wt. %. $Nb_2O_5$ may be used in an amount of up to 3 wt. %, advantageously only up to 1 wt. %. The amount of $CeO_2+WO_3+MoO_3+Nb_2O_5$ is limited to 3 wt. %, again because of the appearance of a yellow tint.

(5) ZnO and alkaline-earth oxides from the group MgO, SrO and BaO are batch constituents that are (may be) used to optimize melting behaviour of the glass. Generally they also affect the glass-ceramic, particularly its microstructure, the crystallite sizes and the residual glass phase. They may affect coloration and clarity as well.

BaO (0-2.5 wt. %) and SrO (0-2.5 wt. %), being constituted of relatively large ions, do usually not enter the crystallite phase during crystallization. They rather completely remain in the residual glass phase and may thus increase its amount and, consequently increase the coefficient of thermal expansion (CTE) of the glass-ceramic. Therefore, their amounts can not exceed 2.5 wt. % each. Preferably, less than 1 wt. % of each BaO and SrO are present in the glass-ceramic. However, they may affect the refractive index of the glass phase in an advantageous way, leading to higher optical clarity.

MgO (0-3 wt. %) and ZnO (0-4 wt. %), on the other hand, at least partly enter the crystallite phase. Their effect on the residual glass phase is significantly less pronounced if their total amounts are limited. While the inventors have observed that additions of ZnO may result in lower coefficients of thermal expansion, additions of MgO increase the coefficient of thermal expansion (CTE). They have also observed that additions of MgO generally results in increasing crystallite size and, eventually, decreasing optical clarity. For those reasons, the total amount of MgO and ZnO shall not exceed the limit of 4.6 wt. %. On the other hand, a minimum of 2.2 wt. % of the sum MgO and ZnO is required for several reasons. ZnO and MgO make the glass easier to melt. Particularly, they help in dissolving the relatively high amount of $ZrO_2$ ($\geq 2$ wt %). Without this, the liquidus temperature of the glass melt may increase strongly, with the above mentioned consequences. In addition, MgO and ZnO are needed in at least this quantity for their effect (as discussed) on crystallite phases: they are known to enter, at least partly, the β-quartz phase during crystallization. Then, they affect the coefficient of thermal expansion (CTE): if they are not present or present in very low quantities, this can result in too high negative values of thermal expansion. Finally, the inventors have also observed that surface cracks may occur after ceramming on samples that do not contain a sufficient amount of MgO+ZnO. Therefore, the glass-ceramic material of the invention contains MgO and ZnO in the following weight percentages:

MgO 0-3

ZnO 0-4 with MgO+ZnO: 2.2-4.6 with, advantageously, MgO+ZnO: 2.7-4.4.

ZnO is, on the other hand, known to usually not completely, but only partially, enter the crystallite phase. The part of ZnO that does not enter the crystallite phase remains in the residual glass phase with effects similar to those that may be caused by SrO and/or BaO. Therefore, preferably, due to their coupled impacts, the total amount of ZnO, SrO and BaO is limited as well. The inventors have found that the sum ZnO+BaO+SrO preferably does not exceed 4 wt. % in order to obtain glass-ceramics with optimal clarity and low coefficient of thermal expansion (CTE). The inventors have also found that at least 1 wt. % of ZnO+BaO+SrO is preferably present in reference to the meltability, the homogeneous microstructure and the prevention of surface cracks. So the glass-ceramic material of the invention contains ZnO, BaO and SrO in the following percentages:

ZnO 0-4 (with MgO+ZnO: 2.2-4.6)

SrO 0-2.5

BaO 0-2.5, with preferably ZnO+BaO+SrO: 1-4 and with, very preferably, ZnO+BaO+SrO: 1-3.5.

Particularly preferably, the amounts satisfy at least one, desirably two, of the following two conditions: (i) MgO+ZnO: 2.7 wt. %-4.4 wt. %; and (ii) ZnO+BaO+SrO: 1.0 wt. %-3.5 wt. %.

The advantageous and particularly preferred conditions allow to optimize the thermal expansion coefficient (CTE), the crystalline phase and the ceramming period.

(6) The glass-ceramic materials of the invention may also include 0 to less than 1 wt. % of alkaline oxides, apart from $Li_2O$, i.e. $Na_2O$ and $K_2O$. Preferably, $Na_2O$ is not present. Preferably, $K_2O$ is present alone in an amount in the range from 0 to less than 0.8% by weight. After ceramming, the alkali ions remain in the vitreous phase. They increase the coefficient of thermal expansion (CTE) and may thus be used to compensate for thermal expansion coefficients (CTE) which are too negative. They can also reduce the melting temperature and increase the dissolution of $ZrO_2$, i.e. simplify implementation of the method. If used in too large a quantity, the thermal expansion is too great and nucleation may become difficult to control.

(7) The glass-ceramic materials of the invention may also include up to 4% by weight on the basis of oxides such as $Gd_2O_3$, $La_2O_3$, $Ta_2O_5$ and $Y_2O_3$ (this list is not exhaustive). Such oxides may increase the transparency and optical appearance of the glass-ceramic materials, by increasing the refractive index of the residual vitreous phase, without coloring said glass-ceramic. If used in too large a quantity, thermal expansion increases, the refractive index becomes too high and melting is difficult to implement. Advantageously, the glass-ceramic materials of the invention include only up to 2% by weight of said oxides. In a variation, the glass-ceramic materials of the invention do not include $Ta_2O_5$.

(8) The presence of complementary colorant(s) to yellow within the glass-ceramic materials of the invention is not excluded. This is intended to achieve the desired aim: suppression of any yellowish tint (by compensation). In particular, $Nd_2O_3$ and/or $Er_2O_3$ may be used. $Nd_2O_3$ and $Er_2O_3$ must be used in limited quantities, between 0 and 0.1 wt. %, advantageously between 0 and 0.08 wt. %, highly advantageously between 0 and 0.06 wt. %. Thus, for example, if too much $Nd_2O_3$ is used, a bluish tint is observed; if too much $Er_2O_3$ is used, a pink tint is observed.

(9) Finally, it has been stated that the amount of $Fe_2O_3$ in the glass-ceramic materials of the invention is less than 400 ppm. Clearly, $Fe_2O_3$ is not added intentionally as a constituent ingredient of the glass. If it is present, this is because it is a common impurity in the employed raw materials. Within the context of the invention, $Fe_2O_3$ cannot interfere with $TiO_2$. More generally, however, it is preferable to minimize the presence of iron, but if the raw materials used have to be purified for this reason, it often proves to be too expensive. Further, the presence of $Fe_2O_3$ may in some cases prove to be advantageous as regards melting and refining. Advantageously, the glass-ceramic materials of the invention include less than 300 ppm of $Fe_2O_3$; highly advantageously, they include less than 200 ppm of $Fe_2O_3$.

The glass-ceramic materials of the invention, the composition of which has just been described, are characteristically free of the following, with the exception of inevitable traces: (i) $TiO_2$ (thereby avoiding any interaction thereof with $Fe_2O_3$, $SnO_2$, $CeO_2$ and $Nb_2O_5$, any appearance of a yellowish coloration); (ii) arsenic oxide and antimony oxide (thereby avoiding the toxicity thereof in the end product); and (iii) phosphates (thereby ensuring homogeneity and transparency, and preventing corrosive effects of the glass melt or vapors that originate from this melt during processing in a melting unit).

Thus, none of these compounds is added deliberately as a raw material in the manufacture of the glass-ceramic materials of the invention.

Entirely surprisingly, it was possible to dispense with the action of said compounds to produce glass-ceramic materials satisfying the specifications presented in the introduction to the present text (essentially colorless transparent β-quartz glass-ceramic materials, the ceramming treatment of which does not last more than 6 h).

The advantageous ranges indicated above are to be considered independently of each other and also in combination with each other.

The glass-ceramic materials of the invention advantageously have the following composition by weight (i.e. their composition, expressed as a percentage by weight on the basis of oxides, essentially (as defined above) consists of the following:

| | |
|---|---|
| $SiO_2$ | 67.7-70.7 |
| $Al_2O_3$ | 18.7-21 |
| $Li_2O$ | 2.5-3.6 |
| $ZrO_2$ | 2.4-3.8 |
| $SnO_2$ | 0.6-1.8 |
| $CeO_2 + WO_3 + MoO_3$ | 0-<0.6 |
| $Nb_2O_5$ | 0-1 |
| MgO | 0-3 |
| ZnO | 0-4 with MgO + ZnO  2.2-4.6 |
| SrO | 0-<1 |
| BaO | 0-<1 |
| $K_2O$ | 0-<0.8 |
| $Gd_2O_3 + La_2O_3 + Ta_2O_5 + Y_2O_5$ | 0-2 |
| $Nd_2O_3 + Er_2O_3$ | 0-0.06 |
| $Fe_2O_3$ | <0.02. |

Referring now to the general composition indicated above and to the advantageous composition shown above, we preferably have, in addition: (a) MgO+ZnO: 2.7-4.4; and/or (b) ZnO+BaO+SrO 1-4 (indeed, more preferably: 1-3.5).

Advantageously, the glass-ceramic composition of the invention is also free of halides, with the exception of inevitable traces. Problems linked to the use of halides (corrosion, pollution) have been mentioned above. Thus, advantageously no halide is deliberately added as a raw material in the manufacture of the glass-ceramic materials of the invention.

Advantageously, the glass-ceramic composition of the invention is also free of borates, with the exception of inevitable traces. The presence of borates facilitates opalescence. Thus, advantageously, no borate is deliberately added as a raw material in the manufacture of the glass-ceramic materials of the invention.

Highly advantageously, the composition of the glass-ceramic materials of the invention is also free of halides and borates, with the exception of inevitable traces.

In a second aspect, the present invention provides articles made of glass-ceramic materials as described above. Said articles may be, e.g., a cook plate, a cooking utensil, a microwave oven plate, a fireplace window, a fire door or window, a viewing window for pyrolysis or catalysis furnaces, a lens article, an article of tableware or an architectural element.

In a third aspect, the present invention provides lithium aluminosilicate glasses, precursors of the glass-ceramic materials of the invention, as described above. The lithium aluminosilicate glasses, which have the compositions indicated above for the glass-ceramic materials of the invention, are novel.

In a fourth aspect, the present invention provides a method of producing a glass-ceramic material of the invention as described above. Conventionally, said method comprises heat treating a lithium aluminosilicate glass which is a precursor of said glass-ceramic or a mineral charge, itself a precursor for such a lithium aluminosilicate glass, under conditions which ensure ceramming. Such a ceramming treatment is known per se.

According to the invention, it is carried out on a glass or a mineral charge which has a composition by weight which corresponds to that of a glass-ceramic of the invention as defined above in the present text.

In a fifth aspect, the present invention provides a method of producing an article made of a glass-ceramic in accordance with the invention. Said method conventionally comprises the following three successive steps: (i) melting a lithium aluminosilicate glass or a mineral charge, a precursor of such a glass, said glass or said charge including an effective and non-excessive quantity of at least one fining agent; followed by fining the molten glass obtained; (ii) cooling the fined molten glass obtained and simultaneously forming it to the desired shape for the envisaged article; and (iii) ceramming said formed glass.

Characteristically, in accordance with the invention, said glass or said mineral charge in question has a composition by weight which corresponds to that of a glass-ceramic of the invention as defined above in the present text.

Advantageously, the forming mentioned above (shaping) consists of rolling between rollers to obtain sheets.

The glass in question may be cerammed in less than 6 h, generally 5 h or less.

Ceramming of said glass, which has been shaped, is advantageously carried out for a period of 300 min [minutes] or less at a temperature of less than 1000° C., advantageously less than 950° C. Surprisingly, it has proved possible to obtain the glass-ceramic materials of the invention with ceramming periods which are as short as this.

The ceramming period indicated above corresponds to the time between the temperature of 650° C. and the maximum ceramming temperature (less than 1000° C.), advantageously between 650° C. and 950° C.; said ceramming period corresponds to the nucleation and crystal growth phases.

Said ceramming period excludes the time to reach the temperature of 650° C. and the time for cooling from the maximum temperature.

It was indicated above that said ceramming period may be 300 min or less. It may even be 240 min or less, or even 200 min or less. Surprisingly, it has been shown that it is possible to obtain the glass-ceramic materials of the invention in these short ceramming periods.

In the context of advantageous variations of the method of the invention, the temperature of 650° C. is reached in less than one hour (from that of the shaped product), highly advantageously in less than 30 min; and/or the glass-ceramic obtained is cooled by at least 40° C. from the maximum ceramming temperature in less than 10 min.

The skilled person will fully appreciate the advantages of the present invention. The present invention will now be illustrated by the examples below and the accompanying FIGURE.

EXAMPLES

To produce 1 kg (kilogram) batches of precursor glasses, the raw materials, in the proportions (expressed as the oxides) recorded in the first part of Table 1 below, were carefully mixed.

For melting, the mixtures were placed in platinum crucibles. The filled crucibles were introduced into a furnace pre-heated to 1400° C. They underwent the following melting schedule: temperature ramp-up to 1650° C. at a heating rate of 2° C./min; and then maintaining said temperature of 1650° C. for 12 h.

The crucibles were then removed from the furnace and the molten glass was poured onto a pre-heated steel plate. It was rolled to a thickness of 4 mm. Glass plates of about 20 cm×30 cm (centimeter) were obtained. They were annealed at 650° C. for 1 h and then slowly cooled.

The glass plates obtained were generally highly transparent.

They then underwent a ceramming treatment (crystallization=nucleation+crystal growth), as indicated in the second part of Table 1 below. More precisely: the glass plates were heated rapidly to 650° C., heated from 650° C. to 780° C. at a rate of 20° C./min and left at that temperature of 780° C. for 2 h; then heated from 780° C. to 880° C. (or 900° C.) at a rate of 10° C./min, and finally left at that temperature of 880° C. (or 900° C.) for 1 h.

The glass-ceramic materials obtained had the properties indicated in the third portion of said Table 1.

The color and transmission were determined qualitatively and quantitatively. The term "no coloration" refers to the following CIE Lab color coordinates:

$L^* > 90$;
$-2 < a^* < 2$
$-2 < b^* < 12$ (measured by transmission beneath a standard illuminant C over a 3 mm thick sample). The term "transparent" corresponds to a transmission of at least 80% for a 3 mm thick sample at wavelengths between 550 nm and 800 nm. The term "highly transparent" corresponds to the same thing at wavelengths between 380 nm and 800 nm. For all of the "no coloration" samples, the color points are shown in Table 1.

The thermal expansion coefficient (CTE) was measured by horizontal dilatometry (25° C.-700° C.).

The crystal size (generated by ceramming) was determined using a conventional X ray diffraction technique using polished glass-ceramic samples (Ø=32 mm; e=3 mm). Said size was calculated from diffractograms (X ray) by a Rietveld analysis which is familiar to the skilled person. The values shown were rounded to the nearest 10 (for example, 34 corresponds to 30 and 57 to 60).

The advantage of the present invention is confirmed by the data contained in said Table 1.

Examples C1 and C2 (given by way of comparison) respectively correspond to Examples 3 and 6 of U.S. Pat. No. 6,750,167. The compositions of said examples do not correspond to compositions of the invention, especially since they include phosphates ($P_2O_5$) and neither MgO, nor ZnO. The glass-ceramic materials obtained are opalescent and have very low thermal expansion coefficients (CTE) which were not what was desired. Opalescence is primarily the result of the presence of large β-quartz crystals, but also of the undesirable presence of crystals of β-spodumene following heat treatment.

Example C3 is also given by way of comparison. Because of the limited $SnO_2$ content, the onset of opalescence is observed.

The glass-ceramic materials of Examples 4, 6 and 7 are preferred.

Example 3 illustrates the addition of 1% by weight of $CeO_2$. The glass-ceramic obtained has a higher thermal expansion coefficient (CTE) but remains transparent without significant coloration.

Example 2 illustrates the addition of 2.9% of $Nb_2O_5$. Hence, the onset of amber coloration is observed.

Example 1 illustrates the use of a relative large quantity of $SnO_2$. The coloration and the thermal expansion coefficient (CTE) are affected. This confirms that the glass-ceramic materials of the invention advantageously include at most 1.8% by weight of $SnO_2$.

Example 5 shows that good results are also obtained with relatively large amounts of $SiO_2$. Thus, larger crystals are observed (60 nm: they nevertheless remain small).

The accompanying drawing shows the transmission curves (transmission, expressed as a percentage, as a function of wavelength, expressed in nanometers) of two 3 mm (millimeter) thick glass-ceramic samples. The samples were prepared by cutting 32 mm diameter disks from glass-ceramic plates. The disks (4 mm thick) were then polished on both faces to a thickness of 3 mm. One sample was the material of Example 4 ("4" in the drawing) and the other was a comparative glass-ceramic material ("C" in the drawing, which is Keralite®, a $TiO_2$-containing glass-ceramic material disclosed in EP 0 437 228).

It should also be understood that while the present invention has been described in detail with respect to certain illustrative and specific embodiments thereof, it should not be considered limited to such, as numerous modifications are possible without departing from the broad scope of the present invention as defined in the appended claims.

TABLE 1

| Examples | | 1 | 2 | 3 | 4 | 5 | 6 | 7 | C1 | C2 | C3 |
|---|---|---|---|---|---|---|---|---|---|---|---|
| Composition (wt %) | $SiO_2$ | 70.0 | 69.0 | 70.1 | 68.6 | 70.8 | 68.5 | 67.8 | 65.9 | 67.3 | 71.2 |
| | $Al_2O_3$ | 18.7 | 18.4 | 18.7 | 20.2 | 19.0 | 20.6 | 20.0 | 22.7 | 22.8 | 19.0 |
| | $Li_2O$ | 2.4 | 2.3 | 2.4 | 3.5 | 3.5 | 2.8 | 3.5 | 4.8 | 4.8 | 2.4 |
| | MgO | 2.6 | 1.2 | 2.6 | 1.2 | 1.0 | 1.4 | 1.0 | | | 2.6 |
| | ZnO | 1.3 | 1.6 | 1.3 | 1.6 | 1.7 | 2.4 | 3.3 | | | 1.3 |
| | $ZrO_2$ | 3.0 | 3.0 | 3.0 | 2.8 | 3.0 | 2.8 | 3.6 | 2.4 | 2.4 | 3.1 |
| | BaO | | | | 0.8 | — | — | | | | |
| | $Nd_2O_3$ | | | 0.05 | | | | | | | |
| | $SnO_2$ | 2.0 | 0.8 | 0.8 | 1.2 | 1.0 | 1.5 | 0.8 | 1.3 | 1.3 | 0.4 |
| | $P_2O_5$ | | | | | | | | 2.9 | 1.4 | |
| | $CeO_2$ | | | 1.0 | | | | | | | |
| | $K_2O$ | | 0.8 | | | | | | | | |
| | $Nb_2O_5$ | | 2.9 | | | | | | | | |
| Ceramming# | | 2 h@T1 1 h@T2 | 2 h@T1 1 h@T2 | 2 h@T1 1 h@T2 | 2 h@T1 1 h@T2 | 2 h@T1 1 h@T2 | 2 h@T1 1 h@T2 | 2 h@T1 1 h@T2 | 2 h@T1 1 h@T3 | 2 h@T1 1 h@T3 | 2 h@T1 1 h@T3 |
| Properties after ceramming | Transparency## | TR | TR | TR | HT | TR | HT | HT | OP | OP | SOP |
| | color### | SGY | SAM | NC | NC | NC | NC | NC | WH | WH | WHS |
| | Color points L* | | | 91.5 | 95.8 | 92.3 | 95.6 | 95.6 | | | |
| | a* | | | −0.8 | −0.1 | −1 | −0.1 | −0.2 | | | |
| | b* | | | 8.3 | 1.3 | 10 | 1.7 | 0.8 | | | |
| | CTE (25-700° C.) ($\times 10^{-7} K^{-1}$) | 9.6 | 8.6 | 12.6 | −2.5 | −3.0 | −0.4 | −4.9 | −15.5 | −13.5 | |
| | quartz crystal size(nm) | 40 | 50 | 60 | 40 | 60 | 40 | 30 | 100 | 90 | 90 |

T1: 780° C.; T2: 880° C.; T3: 900° C.
TR: transparent; HT: highly transparent; OP: opalescent; SOP: slightly opalescent.
SGY: slightly gray yellow; SAM: slightly amber; NC: No color; WT: white; WTS: whitish

The invention claimed is:

1. An essentially colorless, transparent glass-ceramic material containing a solid solution of β-quartz as a principal crystalline phase, having a composition, expressed in percentages by weight on a basis of oxides, consisting essentially of:

| | |
|---|---|
| $SiO_2$ | 66-72 |
| $Al_2O_3$ | 18.3-24 |
| $Li_2O$ | 22-5 |
| $ZrO_2$ | 2-5 |
| $SnO_2$ | >0.4-3 |
| $CeO_2$ | 0-<1 |
| $WO_3 + MoO_3$ | 0-<1 |
| $CeO_2 + WO_3 + MoO_3$ | 0-<1 |
| $Nb_2O_5$ | 0-3 |
| $CeO_2 + WO_3 + MoO_3 + Nb_2O_5$ | 0-3 |
| MgO | 0-3 |
| ZnO | 0-4 |
| SrO | 0-2.5 |
| BaO | 0-2.5 |
| $K_2O + Na_2O$ | 0-<1 |
| $Gd_2O_3 + La_2O_3 + Ta_2O_5 + Y_2O_3$ | 0-4 |
| $Nd_2O_3 + Er_2O_3$ | 0-0.1 and |
| $Fe_2O_3$ | <0.04; | wherein, with the exception of inevitable traces, the composition is essentially free of titanium dioxide, arsenic oxide, antimony oxide and phosphates, and the weight percentages of MgO, ZnO, SrO and BaO in the composition are such that (i) MgO+ZnO is in a range of 2.2-4.6, and/or (ii) ZnO+BaO+SrO is in a range of 1-4.

2. The glass-ceramic material according to claim 1, having a composition, expressed in percentages by weight on the basis of oxides, consisting essentially of:

| | |
|---|---|
| $SiO_2$ | 67.7-70.7 |
| $Al_2O_3$ | 18.7-21 |
| $Li_2O$ | 2.5-3.6 |
| $ZrO_2$ | 2.4-3.8 |
| $SnO_2$ | 0.6-1.8 |
| $CeO_2 + WO_3 + MoO_3$ | 0-<0.6 |
| $Nb_2O_5$ | 0-1 |
| MgO | 0-3 |
| ZnO | 0-4 |
| SrO | 0-<1 |
| BaO | 0-<1 |
| $K_2O$ | 0-<0.8 |
| $Gd_2O_3 + La_2O_3 + Ta_2O_5 + Y_2O_5$ | 0-2 |
| $Nd_2O_3 + Er_2O_3$ | 0-0.06 and |
| $Fe_2O_3$ | <0.02. |

3. The glass-ceramic material according to claim 1, the composition of which is further free of halides, with the exception of inevitable traces.

4. The glass-ceramic material according to claim 1, the composition of which is further free of borates, with the exception of inevitable traces.

5. An article made of a glass-ceramic material according to claim 1, consisting of a cook plate, a cooking utensil, a microwave oven plate, a fireplace window, a fire door or window, a view window for pyrolysis or catalysis furnace, a lens article, an article of tableware or an architectural element.

6. A method of producing a glass-ceramic material according to claim 1, comprising heat treating a lithium aluminosilicate glass, a precursor of said glass-ceramic material, or a mineral charge, itself a precursor of such a lithium aluminosilicate glass, under conditions ensuring its ceramization.

7. A method of producing an article according to claim 5, successively comprising:
   melting a lithium aluminosilicate glass or a mineral charge, a precursor of such a glass, said glass or said charge including an effective and non excessive quantity of at least one fining agent; followed by fining the molten glass obtained;
   cooling the fined, molten glass obtained and simultaneously forming it into a desired shape for the article; and
   ceramizing said shaped glass.

8. The method according to claim 7, wherein ceramization is carried out for a period of 300 min or less at a temperature of lower than 1000° C.

* * * * *